(12) United States Patent  
Fehèr (10) Patent No.: US 8,079,283 B2  
(45) Date of Patent: Dec. 20, 2011

(54) DEVICE FOR ACTIVATING GEARSHIFT FORKS

(75) Inventor: Zoltán Fehèr, Schwieberdingen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 1063 days.

(21) Appl. No.: 11/822,381

(22) Filed: Jul. 5, 2007

(65) Prior Publication Data

US 2008/0034912 A1    Feb. 14, 2008

Related U.S. Application Data

(63) Continuation of application No. PCT/EP2006/000014, filed on Jan. 3, 2006.

(30) Foreign Application Priority Data

Jan. 4, 2005 (DE) .......................... 10 2005 000 700

(51) Int. Cl.  
*F16H 63/34* (2006.01)
(52) U.S. Cl. ................................. 74/473.25; 74/473.11
(58) Field of Classification Search ............... 74/473.24, 74/473.25, 473.11  
See application file for complete search history.

(56) References Cited

U.S. PATENT DOCUMENTS

| 1,726,132 | A | * | 8/1929 | Williams .................... 74/473.24 |
| 1,774,026 | A | * | 8/1930 | Manville ...................... 74/473.1 |
| 2,137,959 | A | * | 11/1938 | Turek .......................... 192/3.57 |
| 2,157,592 | A | | 5/1939 | Casler |
| 4,277,983 | A | | 7/1981 | Izumi et al. |
| 4,583,418 | A | | 4/1986 | Nakayama et al. |

FOREIGN PATENT DOCUMENTS

GB                948509 A        2/1964

OTHER PUBLICATIONS

International Search Report dated Apr. 4, 2006 with English translation (Six (6) Pages).

* cited by examiner

*Primary Examiner* — William C Joyce  
(74) *Attorney, Agent, or Firm* — Crowell & Moring LLP (57) ABSTRACT

A selector fork operating device is provided, for the selective operation of at least two selector forks in a gearbox with a blocking device for blocking a selector fork which is not to be operated and with a driver for driving a selector fork for operation in an axial direction. The selector fork operating device has a bearing axle arranged in the axial direction, which supports at least one blocking part of the blocking device or at least one driving part of the driver. A gearbox, in particular, a motor vehicle gearbox with such a selector fork operating device is also provided.

31 Claims, 6 Drawing Sheets

DEVICE FOR ACTIVATING GEARSHIFT FORKS

CROSS-REFERENCE TO RELATED APPLICATIONS

This application is a continuation of PCT International Application No. PCT/EP2006/000014, filed on Jan. 3, 2006, which claims priority under 35 U.S.C. §119 to German Application No. 10 2005 000 700.7, filed Jan. 4, 2005, the entire disclosures of which are expressly incorporated by reference herein.

BACKGROUND AND SUMMARY OF THE INVENTION

The invention relates to a gearshift fork activation device for optionally activating at least two gearshift forks of a gearbox, having a blocking device for blocking a gearshift fork which is not to be activated and having a driver for driving a gearshift fork, to be activated, in an axial direction.

Such devices are usually components of a rotational speed torque converter, in particular of a two-stage gearwheel speed transforming gearbox for motor vehicles. A change of gear speed or transmission ratio of such a speed transforming gearbox, which is used as a main gearbox, is activated by two mechanical input signals. One input signal is generated by the selection direction of the gearshift lever. In this context, it is necessary to decide which of the gearshift forks available for selection is to be activated. The second input signal is generated by the shifting direction of the gearshift lever. For example, the gearshift fork can be moved in the shifting direction between two shifted positions and a neutral position. The shifting direction and selection direction are usually transmitted as mechanical signals to the gearbox via a Bowden cable or a linkage. These two mechanical input signals are used at the input of the transmission for selecting the gearshift fork to be activated and for moving the selected gearshift fork between the corresponding positions using the driver. In a three-gear-speed main gearbox with a reverse gear speed, for example, these two mechanical input signals are transmitted to two gearshift forks, which can each assume two shifted positions and one neutral position. During the selection and the subsequent activation of the gearshift fork it is necessary to ensure that the gearshift forks move only in accordance with a predefined shifting scheme and no inadmissible states can be set. For example, two gearshift forks must not be in engagement at the same time.

According to the prior art, the selection movement of the gearshift lever is converted at the gearbox into, for example, a linear movement of a shifting finger in order to select a gearshift lineal. In this context, the gearshift finger slides on a linkage in a transverse movement with respect to the longitudinal axis of the gearshift lineal in a gearshift gate, which is formed by recesses in the gearshift lineals that are oriented in parallel. The shifting movement, that is to say the activation of a gearshift lineal which has a gearshift fork, can, for example, be converted into a rotational movement of the gearshift finger, which then moves the gearshift fork over the selected gearshift lineal along the longitudinal axis of the gearshift lineal and thus engages parts of the gearbox in the force flux or disengages them from it.

In the case of partially automated or fully automated change speed gearboxes, it is possible for the mechanical input signals (the shifting direction and the selection direction) also to be supported or converted by use of electromotive, pneumatic or hydraulic actuation means, and for the gearbox to be controlled in this way.

While the gearbox is being operated, it is necessary always to ensure that the gearshift forks, or the gearshift lineals which are associated therewith, move only according to the predefined shifting scheme (for example, an H shifting pattern) during selection and gear shifting processes and no inadmissible states, for example also those due to vibrations, can be set. In particular, it is necessary to avoid two gearshift forks being able to be placed in engagement simultaneously to gearbox parts.

Gearboxes according to the prior art have the disadvantage that the gearshift lineals and the gearshift forks attached thereto and the control unit which activates the gearshift lineals are complex to mount. Furthermore, such control units often have a very complicated design.

The invention is consequently based on the object of developing a gearshift fork activation device for a gearbox in such a way that the above mentioned disadvantages are avoided. The intention is, in particular, that such a gearshift fork activation device will have a simple design with very few components.

The gearshift fork activation device according to the invention includes a bearing axle, which is arranged in the axial direction and which supports at least one blocking part of the blocking device and at least one driver part of the driver. The support of a blocking part and of a driver part on a bearing axle, which extends in the axial direction, ensures that, on the one hand, the mounting of the gearshift fork activation device can be carried out essentially independently of the remaining parts of the gearbox in terms of the selecting, shifting and blocking functions of the gearshift fork activation device. On the other hand, in a further step the functionality of the gearshift activation device is likewise checked independently of that of the gearbox. Together these produce significant progress in terms of safety-optimized and productivity-optimized production of change speed gearboxes. Furthermore, the arrangement of the blocking part and of the driver part on the axially arranged bearing axle permits a considerable reduction in components while maintaining the same functionality, and a reduced probability of failure is also implemented. In particular, a short distance between the blocking parts and driver parts such as, for example, gearshift rods and parts of the gearbox associated therewith, for example, gearwheels, can be implemented. This permits a short design of the corresponding gearshift forks. Finally, this arrangement permits the activation of the bearing axle, which supports the blocking part and the driver part, to be advantageously facilitated by a booster unit or for it to be entirely or partially automated by use of suitable actuator elements.

In one advantageous embodiment, there is provision for the bearing axle to be formed by a piston rod, in particular by a piston rod of a servo cylinder. In this way, it is possible for the force transmitting unit, in particular the servo cylinder, to activate directly the bearing axle which is embodied as a piston rod, and thus support disengagement or engagement of gearbox parts into the force flux, and in particular also to carry this out automatically. The mounting and the checking can also be performed independently of the actual gearbox here.

In particular, it is advantageously possible to provide for the driver part to be arranged so as to be displaceable in the axial direction. The driver part can thus drive the gearshift fork, to be activated, in the axial direction along the bearing axle and thus shift parts of the gearbox.

In a further advantageous embodiment, the bearing axle supports the driver part in such a way that it can carry out a rotational movement about the axial direction. In this way, the selection of a gearshift fork to be activated can thus be made possible by the rotational movement of the driver part, for example.

One preferred further development of the invention provides for the driver part to have an external circumferential section with a first control contour, which is provided for interacting with circumferential contours of at least two gearshift fork rods that support the at least two gearshift forks. Through a corresponding embodiment of the first control contour and of the circumferential contours of the gearshift fork rods with which the first control contour of the driver part interacts, it is thus possible to drive a gearshift fork, to be activated, in an axial direction. By correspondingly changing the position of the driver part, it is possible to select the gearshift forks to be activated and drive them while other gearshift forks, which are not to be activated, can be released.

Furthermore, there is advantageously provision for the first control contour to drive the gearshift fork to be activated in the axial direction and at the same time not act on the gearshift fork which is not to be activated. When there is a change in position of the driver part, the first control contour interacts with the circumferential contour of the gearshift fork which is to be activated and at the same time does not interact with the circumferential contour of the second gearshift fork which is not to be activated, by virtue of a corresponding configuration of the first control contour and of the circumferential contours of the gearshift fork rods which are to be activated. In this way, the gearshift fork which is to be activated is selected and can be slid in the axial direction.

Furthermore, in one preferred embodiment, there is provision for the blocking part to be secured in the axial direction. This brings about blocking of the gearshift fork, which is not to be activated, in the axial direction and thus easily prevents undesired engagement or disengagement of gearbox parts when the blocking part interacts with a gearshift fork which is not to be activated.

Furthermore, it is possible to provide for the bearing axle to support the blocking part in such a way that it can carry out a rotational movement about the axial direction. Such a rotational movement allows the blocking part to interact with the gearshift fork which is to be activated and thus block sliding of the gearshift fork to be activated in the axial direction.

In particular, it is possible for one advantageous embodiment to provide for the blocking part to have an external circumferential section with a second control contour, which is provided for interacting with circumferential contours of at least two gearshift fork rods that support the at least two gearshift forks. In this way, the blocking part can interact, by way of the second control contour with the circumferential contour of a gearshift fork rod which has a gearshift fork which is not intended to be activated. A suitable rotation of the blocking part can thus control the freedom of movement of the gearshift fork which is not to be activated.

In preferred embodiments of the device according to the invention, there is also provision for the second control contour to block a movement of the gearshift fork, which is not to be activated, in the axial direction and at the same time release a movement of the gearshift fork, which is to be activated, in the axial direction. This blocking interaction of the second control contour with a gearshift fork, which is not to be activated, and the simultaneous release of a gearshift fork, which is to be activated, controls the axial movements of the gearshift fork by way of a single control movement. This permits a considerable reduction in the number of components to be used, and thus also provides a significant cost saving.

A further advantageous embodiment is obtained by virtue of the fact that a rotational movement of the blocking part about the axial direction is coupled to a rotational movement of the driver part about the axial direction. The coupling, in particular the synchronization of the rotational movements of the blocking part and of the driver part about the axial direction, in this way brings about, given a suitable rotational movement, release of the gearshift fork which is to be activated and blocking of the gearshift fork which is not to be activated. At the same time, it brings about interaction between the driver part and the gearshift fork which is to be activated, so that during a subsequent movement of the driver part, which takes place in the axial direction, the gearshift fork which is to be activated is driven in the axial direction, while at the same time the blocking part of the blocking device blocks the gearshift fork, which is not to be activated, in the axial direction. This coupling of the movements reduces the expenditure on controlling the gearbox.

Furthermore, in one advantageous embodiment there is provision for the driver part and the blocking part to be arranged coaxially. A coaxial arrangement of the driver part and of the blocking part on the bearing axis, which extends in the axial direction, permits, for example, a synchronous movement of the driver part and of the blocking part and, furthermore, permits a relative movement of the drive part and blocking part in the axial direction. This permits simple and cost-effective simultaneous control of the driver part and blocking part.

Likewise, in one embodiment there is advantageous provision for the driver part to have at least one groove. One or more such grooves can interact with corresponding pins or webs in, for example, one section of a housing. This permits the movements of the driver to be controlled. For example, activation of a gearshift fork is ensured only within a predefined shifting scheme.

The invention furthermore relates to a gearbox, in particular for motor vehicles, having a gearshift fork activation device according to the invention.

In such a gearbox it is possible, in particular, to provide for such gearbox to be a manual or partially automatic change speed gearbox. For example, the gearshift fork activation device according to the invention may be configured for a manual change speed gearbox with Bowden cable activation.

The invention provides for common mounting of the blocking part and driver part on an axially arranged bearing axle, which makes available a modular gearbox control unit. The modular gearbox control unit can be premounted and checked together with the gearshift forks. The finished unit can then be installed in the gearbox casing. Furthermore, in this way it is possible to implement a simple design with very few components, which design has a small installation space and in which gearshift forks which are not used can be blocked mechanically. Furthermore, the entire shifting and selection mechanism can be mounted on a booster unit such as, for example, a servo cylinder.

Other objects, advantages and novel features of the present invention will become apparent from the following detailed description of the invention when considered in conjunction with the accompanying drawings.

DETAILED DESCRIPTION OF THE DRAWINGS

In the following description of the drawings, identical reference symbols designate identical or comparable components. The components of a gearbox which are not important for understanding the invention have been omitted for reasons of clarity.

The gearshift fork activation device illustrated here is provided for a three-gear-speed main gearbox with a reverse gear speed. Of course, it is also possible to use the device according to the invention to control gearboxes with a higher or lower number of gear speeds or even gearbox groups and combinations of gearboxes.

Figures 1A, 1B:
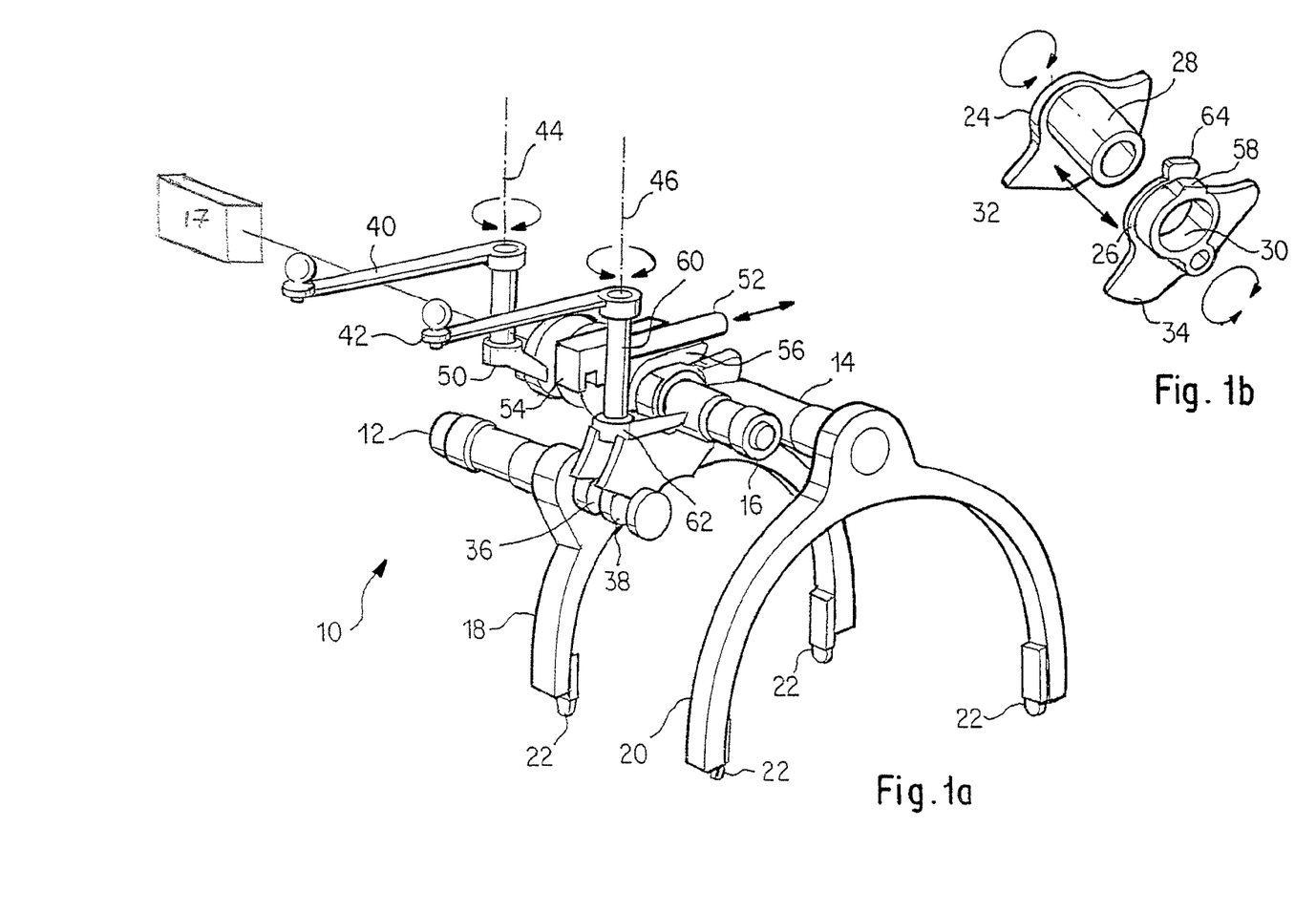
FIG. 1a is a perspective view of a preferred embodiment of a gearshift fork activation device according to the invention.
FIG. 1b is a detailed perspective view of the gearshift fork activation device according to the invention.

FIGS. 1a and 1b show a perspective view of the preferred embodiment of a gearshift fork activation device according to the invention and details of the preferred embodiment of the gearshift fork activation device according to the invention. The gearshift fork activation device 10 has three axles, which are arranged in parallel. Two axles are formed by a first gearshift fork rod 12 and a second gearshift fork rod 14. One bearing rod forms the third axle in the form of a bearing axle 16. The gearshift fork rods 12, 14 are mounted in parts (not illustrated) of a gearbox casing so as to be rotatable about their axis and slidable along their longitudinal axis, and the bearing axle 16 can slide along its longitudinal axis.

The first gearshift fork rod 12 has a first gearshift fork 18, which extends away from the longitudinal axis of the bearing axle 16. Parallel to the plane formed by the first gearshift fork 18 and also pointing away from the longitudinal axis of the bearing axle 16, a second gearshift fork 20 extends. The second gearshift fork 20 is mounted on a free end of the second gearshift fork rod 14. The gearshift forks 18, 20 are each essentially in the shape of a semicircle and have a guide element 22 on the inner sides of each of their ends. These guide elements 22 engage in double shifting sleeves (not illustrated) of the gearbox.

The driver part 24 and the blocking part 26 are located on the bearing axle 16. The driver part 24 is seated concentrically on the bearing axle 16 and has a guide section 28 whose surface constitutes a polygonal cylinder which is oriented parallel to the bearing axle. This polygonal external surface of the guide section 28 is in contact with the internal surface 30 of blocking part 26, which is also configured in the shape of a polygonal cylinder and which is also arranged concentrically on the bearing axle 16. The driver part 24 and the blocking part 26 can thus move axially in relation to one another but not rotate with respect to one another. The blocking part 26 can therefore only carry out a rotational movement about the bearing axis 16 together with the driver part. Instead of the polygonal connection between the driver part 24 and the blocking part 26, it is also possible to select a sliding spring.

Furthermore, the driver part 24 has a first control contour in the form of a driver control contour 32, and the blocking part 26 has a second control contour in the form of a blocking control contour 34. The driver control contour 32 and the blocking control contour 34 interact with corresponding circumferential grooves in the control fork rods 12, 14. This illustration shows the driver circumferential groove 36 and the blocking circumferential groove 38 of the first control fork rod 12. These grooves 36, 38 are provided as circumferential grooves in the first control fork rod 12. Furthermore, this illustration shows two rotary levers 40, 42 at the gearbox input. These rotary levers 40, 42 are able to be rotated about the axes 44, 46. The axes 44, 46 are arranged perpendicularly to the axes formed by the gearshift fork rods 12, 14 and with respect to the longitudinal axis of the bearing axle 16.

The selector lever 40 is connected in a rotationally fixed fashion to a selector lever rod 48 which is itself mounted so as to be rotatable about the axis 44. The selector lever rod 48, in turn, has an activation lever 50, which is connected in a rotationally fixed fashion to it and which is arranged perpendicularly with respect to the axis 44 and perpendicularly with respect to the select lever 40. This activation lever 50 activates a selector rod 52, which extends perpendicularly with respect to the axes of the gearshift fork rods 12, 14 and with respect to the longitudinal axis of the bearing axis 16, as well as perpendicularly with respect to the axis 44 or 46 and lies in the plane formed from the gearshift forks 18, 20.

The activation lever 50 is coupled to the activation head 54 of the selector rod 52. The selector rod 52 is mounted so as to be slidable along its axis. It has, on its surface facing the bearing axis 16, a toothing 56, which engages with a toothing section 58 of the blocking part 26. The toothing section 58 is arranged on the upper side of the blocking part 26 which faces away from the gearshift forks. Alternatively, instead of the toothing it is also possible to use a link guide or intermediate lever with a ball-bearing.

The gearshift lever 42 has a gearshift lever rod 60 which can rotate about the axis 46 and is connected thereto in a rotationally fixed fashion at one end of the gearshift lever rod 60. The other end of the gearshift lever rod 60 is connected in a rotationally fixed fashion to an activation lever 62. The latter extends perpendicularly with respect to the axis 46 and parallel with respect to the gearshift lever 42 and makes contact with the guide section 28 of the driver part 24.

During operation, the interaction of the individual components is as follows: the rotational movement of the levers 40, 42 has to be transformed into a linear movement of one of the gearshift forks 18, 20. The selector lever 40 and the gearshift lever 42 firstly convert the mechanical input signals, that is to say the selection direction and the shifting direction into a rotational movement. The mechanical input signals are usually transmitted to the gearbox via a linkage or via a Bowden cable (neither illustrated here). If a selection signal is transmitted to the selector lever 40 via such an arrangement, the selector lever 40 as a result rotates the selector lever rod 48 about the axis 44 by a specific angular value. In the case of the activation lever 50, this rotation is transmitted to the activation head 54 of the selector rod 52. The latter is therefore made to move linearly along its own axis by the rotation of the selector lever 40, and it in turn activates the toothing section 58 of the blocking part 26 via the toothing 56. The toothing section 58 is in turn made to rotate about the longitudinal axis of the bearing rod 16. This rotation changes the angular position of the blocking part 46 on the bearing rod 16. As a result, for example, the blocking control contour 34 engages with the blocking circumferential groove 38 of the first gearshift fork rod 12, or it releases, for example, the circumferential groove 38 of the first gearshift fork rod 12. The driver part 24 and the blocking part 26 are connected in a rotationally fixed fashion with respect to the longitudinal axis of the bearing axle 16 by way of the polygonal cylinder surface sections 28 and 30. Consequently, during a rotation of the blocking part 26 about the longitudinal axis of the bearing axis 16, the driver part 24 carries out a rotation in the same direction and by the same angular value. In a way which is complementary to the effects of a movement of the blocking control contour 34, this causes the driver control contour 32 to release, for example, the driver circumferential groove 36 of the first gearshift fork rod 12 or to engage with the driver circumferential contour 36 of the gearshift fork rod 12. The control contours 32, 34 of the blocking part 26 and of the driver part 24 behave in an analogously complementary fashion with respect to the circumferential grooves located on the gearshift fork rod 14 and cannot be seen in this figure. A mechanical input signal activates the gearshift lever 42, the latter causes the gearshift lever rod 62 to be rotated about the axis 46. Subsequently, the activation lever 62 is likewise made to rotate about the axis 46 and passes on this rotational movement as a linear movement to the driver part 24 along the axis defined by the bearing axle 16.

The blocking part 26 furthermore has a guide nose 64 which is guided in a groove (not illustrated in this figure) of the gearbox casing. This groove extends parallel to the plane formed by the gearshift forks and perpendicular with respect to the axis which is defined by the bearing axle 16. In the process, the driver part 24 moves relative to the blocking part 26, to which an axial movement along the longitudinal axis of the bearing axle 16 is passed on by the guide nose 64 which is guided in the casing groove (not illustrated here). At the same time, the driver part 24 also drives with this movement that gearshift fork rod 12, 14 with whose circumferential groove it is in engagement with its driver control contour 32. In the process, the selected gearshift fork rod (12 or 14) carries out a sliding action along its longitudinal axis and in the process in turn also drives the corresponding gearshift fork (18 or 20) during its movement. In the process, by way of the guide elements 22, the corresponding gearshift sleeve of the gearbox is set, i.e. engaged or disengaged. While the selector movement can be used in an unamplified way to select the correct gearshift fork, power boosting, for example by use of a servo cylinder 17 (shown schematically in FIG. 1), is advantageous for the gear shifting movement. In this case, its piston rod can form the bearing axle 16.

Figure 2:
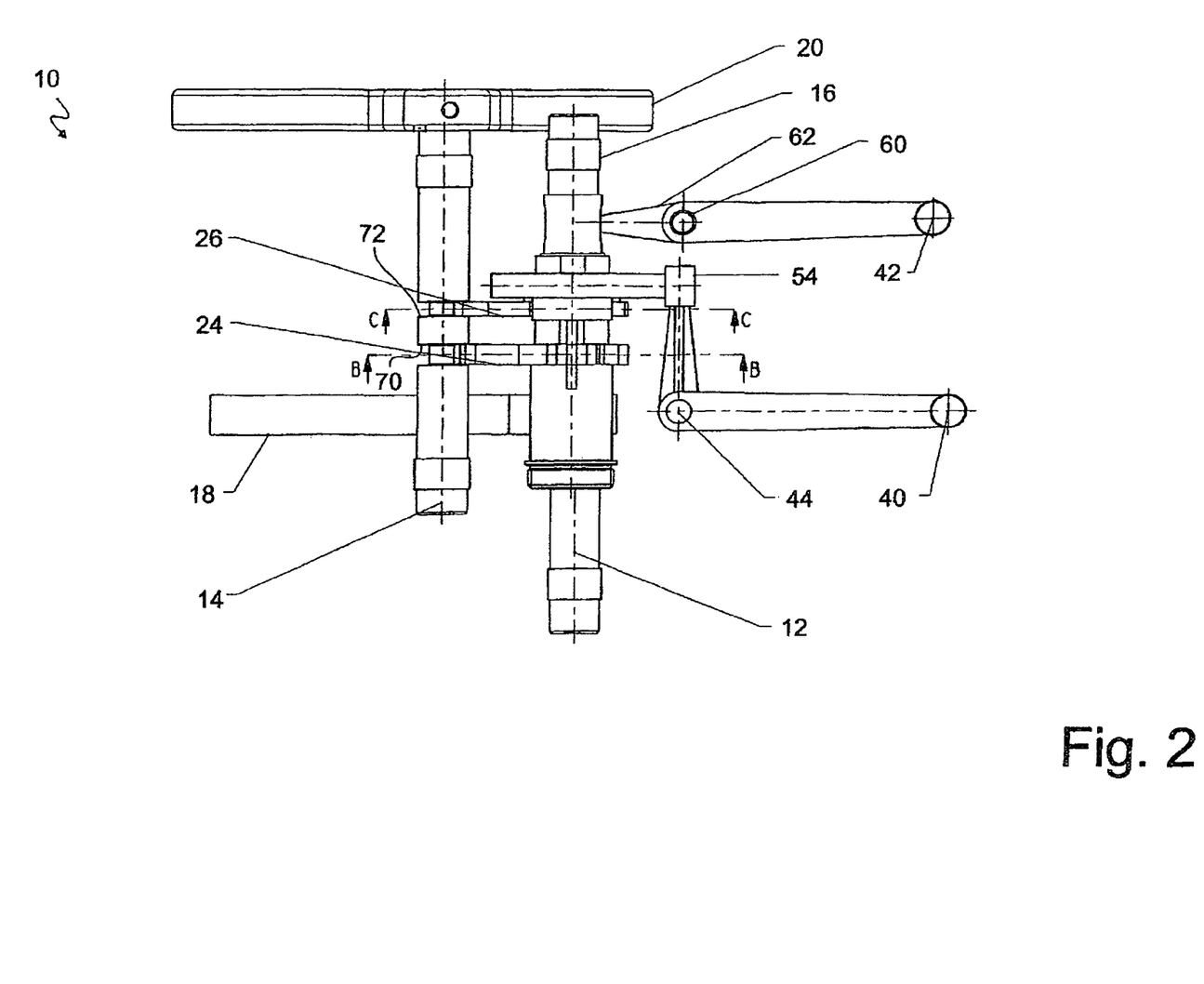
FIG. 2 is a plan view of the preferred embodiment of the gearshift fork activation device according to the invention.

FIG. 2 shows a plan view of the preferred embodiment of the gearshift fork activation device according to the invention. In addition to the elements described with respect to FIG. 1, the gearshift fork activation device 10 according to FIG. 2 also exhibits the following: the second gearshift fork rod 14 also has a driver circumferential groove 70 and a blocking circumferential groove 72. The bearing axle 16 forms a piston rod of a servo cylinder.

During a rotational movement about an axis which is defined by the bearing axle 16, the blocking control contour 34 of the blocking part 26 releases, for example, the gearshift rod 14 and the circumferential groove 72. At the same time, the driver part 24 engages with its driver control contour in the driver circumferential groove 70 of the second gearshift fork rod 14. If a gearshift movement is then applied to the gearshift lever 42 and is passed on via the activation lever 60, the driver part 24 moves along the axis defined by the bearing axle 16. In the process, the driver part 24 also drives the gearshift fork rod 14, which is released by the blocking part 26 and is in driving engagement with the driver part 24. During this movement, the movement of the driver part 24 can be supported by a servo cylinder.

Figure 3:
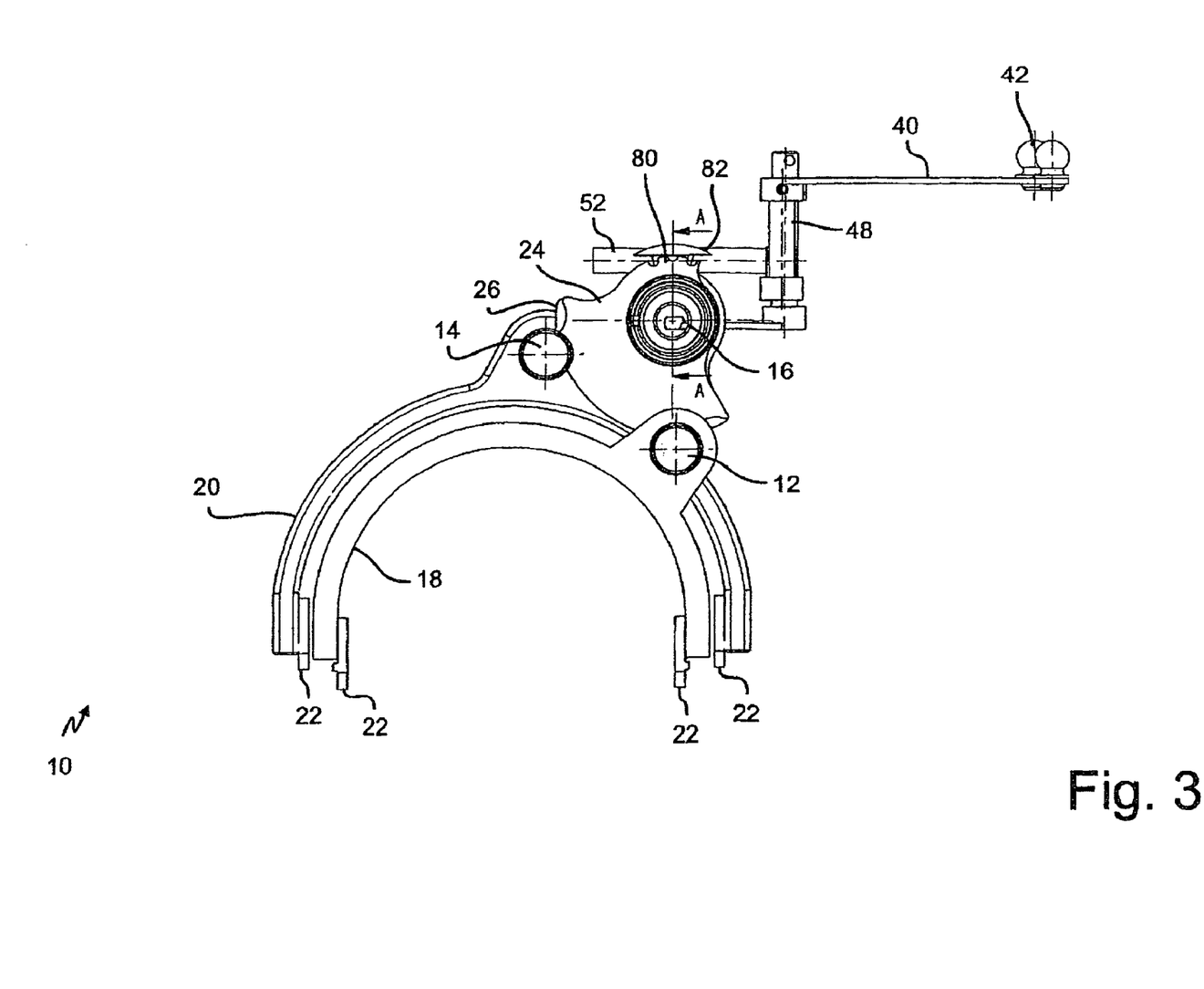
FIG. 3 is a front view of the preferred embodiment of the gearshift fork activation device according to the invention.

FIG. 3 shows a front view of the gearshift fork activation device according to the invention. Here, the partially concealed driver part 24 can be seen in front of the blocking part 26. The driver part 24 has, on its side facing away from the gearshift forks 18, 20, a notch section 80. Furthermore, this side view shows part of the gearbox casing which has a guide groove 82 for the guide nose 64 of the blocking part 26. This guide groove 82 can be provided in the casing (for example, milled) or be secured to the housing as an additional component.

The interaction of the circumferential grooves 36, 38, 70, 72 of the gearshift fork rods 12, 14 with the control contours of the blocking part 26 and of the driver part 24, as well as of the guide nose 64 of the blocking part 26 and of the notch section 80 of the driver part 84 with the casing, will be described in detail with reference to FIGS. 4 and 5.

Figure 4:
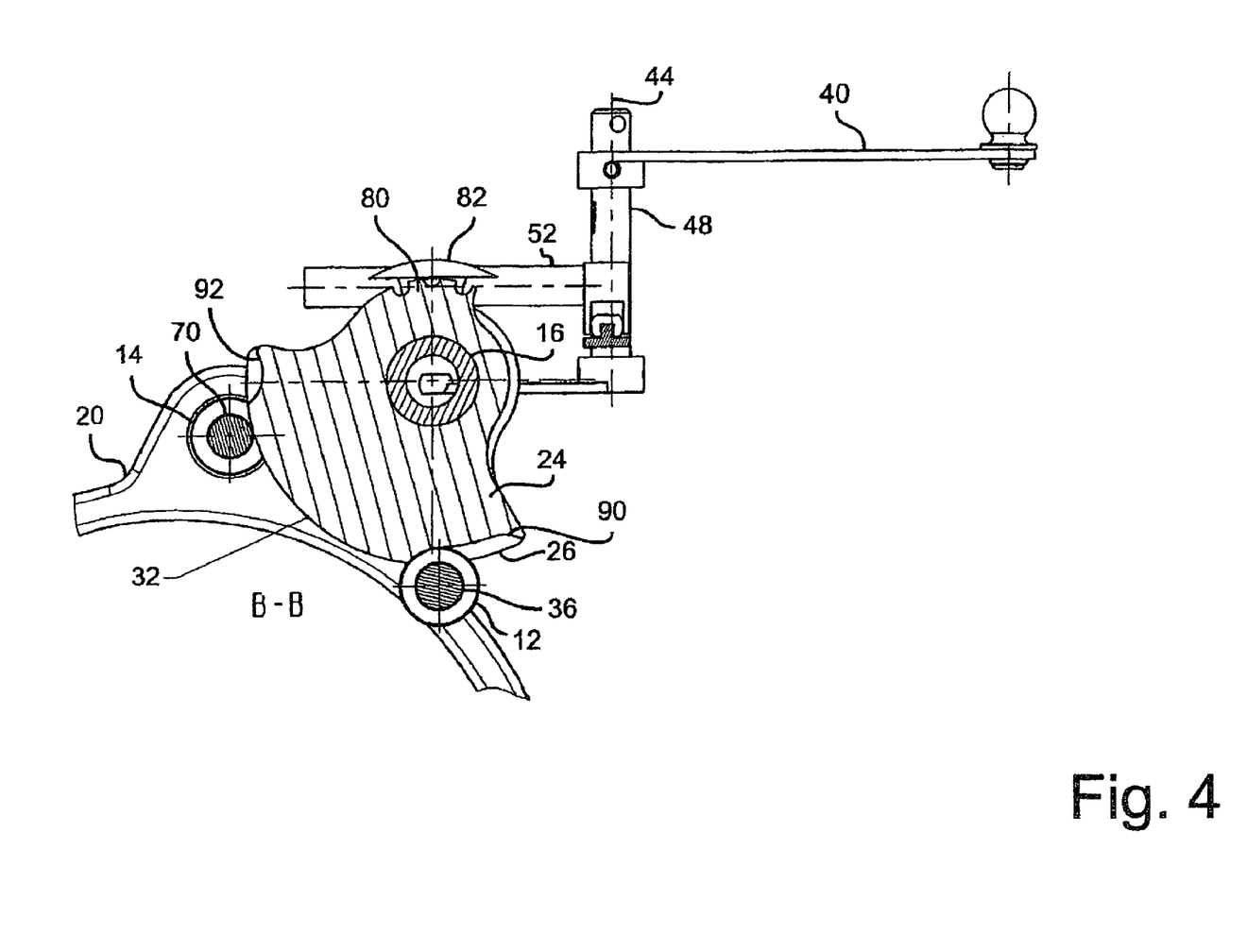
FIG. 4 is a sectional view taken along line B-B in FIG. 2.

FIG. 4 shows a sectional view taken along line B-B in FIG. 2. This sectional view illustrates the functionality of the driver part 24 and, in particular its driver control contour 32 in interaction with the circumferential grooves 36, 70 of the gearshift fork rods 12, 14. The circumferential grooves 36 and 70 are illustrated as relatively small radii of the gearshift fork rods 12, 14 in the sectional view. The driver control contour 32 of the driver part 24 has a first release section 90 in the vicinity of the first gearshift fork rod 12, and a second release section 92 in the vicinity of the second gearshift fork rod 14.

In the illustrated state, the driver part 24 engages via its driver control contour 32 with the circumferential groove 70 of the gearshift fork rod 14. At the same time, the first release section 90, which is located in the vicinity of the first gearshift fork rod 12, releases the first gearshift fork rod 12. As a result of this, when there is an axial movement of the driver part 24, i.e. perpendicularly with respect to the plane of the figure, the second gearshift fork rod 14, and with it the second gearshift fork 20, follow this movement along the longitudinal axis of the gearshift fork rod 14. The first gearshift fork rod 12 and the first gearshift fork 18 connected to it are not moved during this movement. If the driver part 24 then carries out a rotational movement, passed on through the rotational selection lever 40 and through the blocking part 26, in the counterclockwise direction about the axis defined by the bearing axle 16, then the second release section 92 releases the second gearshift fork rod 14 in a specific rotational position and thus permits the driver part 24 to move along the longitudinal axis of the bearing axle 16 without also driving the second gearshift fork rod 14. At the same time, the driver control contour 32 enters into engagement with the circumferential groove 36 of the first gearshift fork rod 12 and thus permits the latter to be driven along its longitudinal axis given a corresponding movement of the drive part 24.

Figure 5:
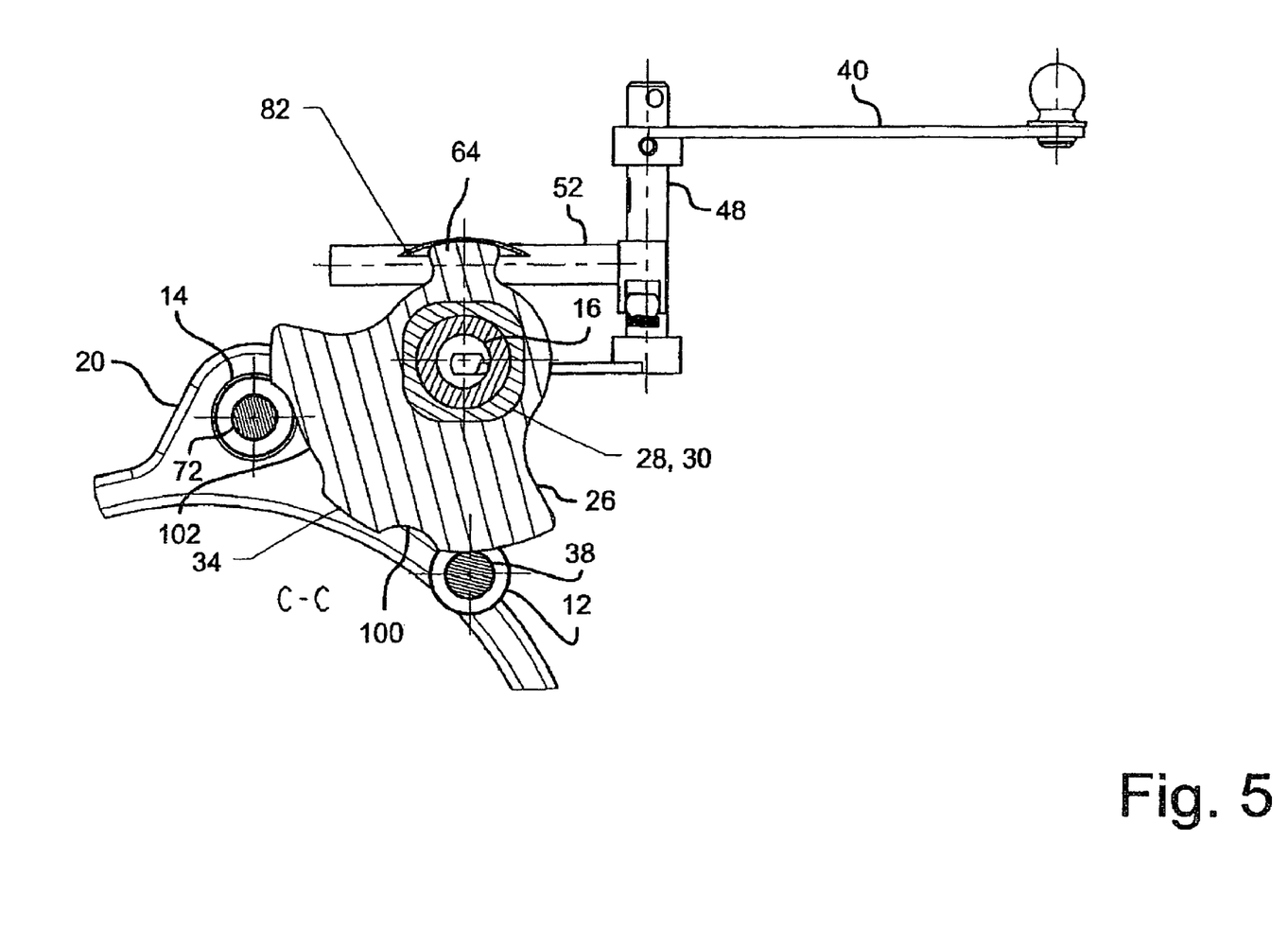
FIG. 5 is a sectional view taken along line C-C in FIG. 2.

FIG. 5 shows a sectional view taken along line C-C in FIG. 2. The blocking part 26 has, on its blocking circumferential contour 34, a first release section 100 which is arranged in the vicinity of the first gearshift fork rod 12, and a second release section 102 which is arranged in the vicinity of the second gearshift fork rod 14. The blocking part 26 is positioned with its control circumferential contour 34 in engagement with the circumferential groove 38 of the first gearshift fork rod 12. At the same time, the second release section 102 releases the second gearshift fork rod 12. In this position, which corresponds to that illustrated in FIG. 4, the blocking part 26 blocks the first gearshift fork rod 12 and permits an axial sliding capability of the second gearshift fork rod 14.

When the driver part 24 moves relative to the blocking element 26, which movement is made possible by the polygonal cylindrical boundary surfaces 28, 30 along the axis defined by the bearing axle 16, an undesired movement of the first gearshift fork rod 12 is prevented by the blocking control contour 34 which is in engagement with the blocking circumferential groove 38 of the first gearshift fork rod 12. An axial sliding capability of the blocking part 26 itself is prevented by the guide nose 64, illustrated in engagement with a groove 82 which is located in the casing. If the driver part 24 rotates about the axis defined by the bearing axle 16, the blocking part 26 is likewise also rotated by the polygonal cylindrical surfaces 28, 30. If this rotation is carried out in the counterclockwise direction, the first release section 100 of the blocking control contour 34 releases the first gearshift fork rod 12 in a first specific angular position. At the same time, the release of the second gearshift fork rod 14 by the second releasing section 102 is cancelled and the blocking control contour 34 moves into engagement with the blocking circumferential groove 72 of the second gearshift fork rod 14. In this way, axial movement of the first gearshift fork rod 12 was made possible, while at the same time such a movement of the second gearshift fork rod 14 is prevented.

Figure 6:
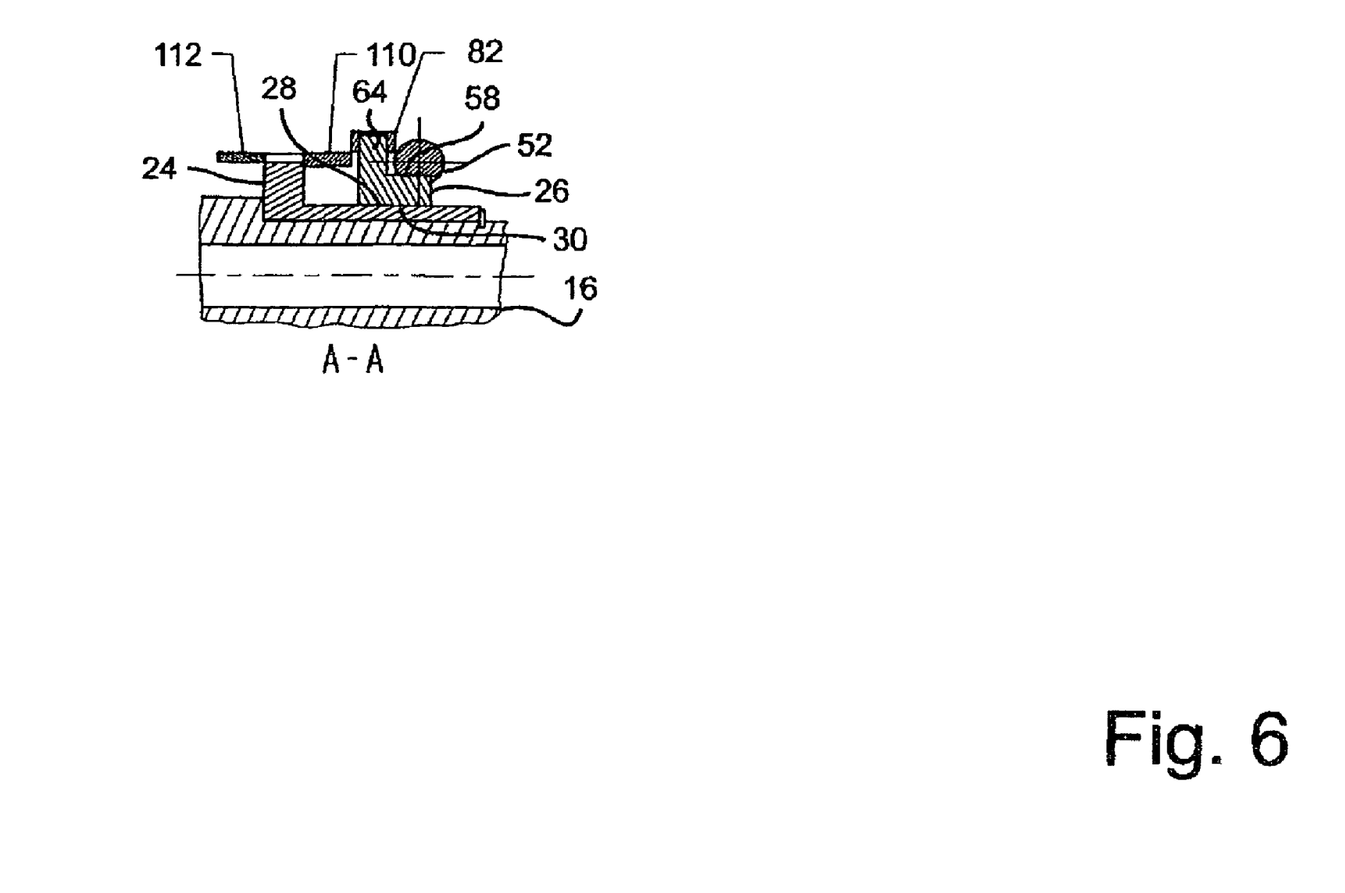
FIG. 6 is a sectional view taken along line A-A in FIG. 3.

FIG. 6 shows a sectional view taken along line A-A in FIG. 3. On the bearing axle 16 there is the driver part 24, which extends with a polygonal cylindrical guide section 28 through the blocking part 26 along the polygonal cylindrical inner surface 30. The guide nose 64 of the blocking part 26 is in the groove 82, which is located in the housing. The selector rod 52 engages with its toothing 56 in the corresponding toothing section 58 of the blocking part 26. Furthermore, the gearbox casing has a relatively low web or pin 110 and a relatively flat web or pin 112. The webs 110, 112 can be worked into the housing or be pressed in as pins.

Under certain circumstances, it is desirable during the operation of the gearshift rod activation device 10 to shift the gearshift forks 18, 20 only into corresponding gearshift positions. For this purpose, specific axial movements of the driver part 24 may be carried out only in specific angular positions, or other specific axle movements are to be made possible given other specific angular positions. For this purpose, a relatively low web 110 and a relative flat web 112 are mounted in the housing of the gearbox. The web geometries correspond to the geometries of the notches of the notched section 80 of the driver part 24. The webs and the notches or grooves are positioned with respect to one another in such a way that they can be coupled only given corresponding rotation of the driver part 24. In specific gearshift schemes, it is furthermore also necessary for the shifting process to be blocked in certain directions. Given a suitable selection of the web geometries and the notch geometries, for example, the relatively low web 110 prevents the driver part 24 from sliding axially in the direction of the relatively low web in specific angular positions of the driver part 24 if the notch of the notch section 80, which would have to engage around the relatively low web 110 in this angular position, does not have the necessary depth. In this way, selective restriction of the freedom of movement of the driver part 24 can be achieved by way of a simple structural measure.

Table of Reference Symbols

10 Gearshift fork activation device
12 First gearshift fork rod
14 Second gearshift fork rod
16 Bearing axle
18 First gearshift fork
20 Second gearshift fork
22 Guide element
24 Driver part
26 Blocking part
28 Guide section
30 Guide surface
32 Driver control contour
34 Blocking control contour
36 Driver circumferential groove
38 Blocking circumferential groove
40 Selector lever
42 Gearshift lever
44 Rotational axis of selector lever
46 Rotational axis of gearshift lever
48 Selector lever rod
50 Activation lever
52 Selector rod
54 Activation head
56 Toothing
58 Toothing section
60 Gearshift lever rod
62 Activation lever
64 Guide nose
70 Driver circumferential groove
72 Blocking circumferential groove
74 Bearing
80 Notch section
82 Guide groove
90 First release section
92 Second release section
100 First release section
102 Second release section
110 Relatively low web
112 Relative flat web
A-A Sectional plane along the bearing axle 16
B-B Sectional plane through the driver part 24 perpendicularly with respect to the bearing axle 16
C-C Sectional plane through the blocking part 26 perpendicularly with respect to the bearing axle 16

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A gearshift fork activation device for optionally activating at least two gearshift forks of a gearbox, comprising:
    a blocking device for blocking a gearshift fork which is not to be activated;
    a drive for driving a gearshift fork, which is to be activated, in an axial direction;
    a bearing axle arranged in the axial direction and slidable along its longitudinal axis, the bearing axle supporting at least one blocking part of the blocking device and at least one driver part of the driver, the at least one driver part and the at least one blocking part being arranged to together perform a rotational movement about the bearing axle; and
    wherein the bearing axle is a piston rod.

2. The gearshift fork activation device according to claim 1, wherein the piston rod is of a servo cylinder.

3. The gearshift fork activation device according to claim 1, wherein the at least one driver part has an external circumferential section with a first control contour provided for interacting with circumferential contours of at least two gearshift fork rods supporting the at least two gearshift forks, respectively.

4. The gearshift fork activation device according to claim 3, wherein the first control contour drives the gearshift fork to be activated in the axial direction and, at the same time, does not act on the gearshift fork which is not to be activated.

5. The gearshift fork activation device according to claim 3, wherein the blocking part has an external circumferential section with a second control contour provided for interacting with the circumferential contours of the at least two gearshift fork rods supporting the at least two gearshift forks, respectively.

6. The gearshift fork activation device according to claim 5, wherein the second control contour blocks a movement of the gearshift fork, which is not to be activated, in the axial direction and, at the same time, releases a movement of the gearshift fork, which is to be activated, in the axial direction.

7. The gearshift fork activation device according to claim 6, wherein a rotational movement of the blocking part about the axial direction is coupled to a rotational movement of the driver part about the axial direction.

8. The gearshift fork activation device according to claim 7, wherein the driver part and the blocking part are arranged coaxially.

9. The gearshift fork activation device according to claim 7, wherein the driver part includes at least one groove.

10. The gearshift fork activation device according to claim 1, wherein the blocking part is secured in the axial direction.

11. The gearshift fork activation device according to claim 1, wherein the bearing axle supports the blocking part such that it is rotationally movable about the axial direction.

12. A motor vehicle gearbox comprising a gearshift fork activation device according to claim 1.

13. The motor vehicle gearbox according to claim 12, wherein the gearbox is a manual or partially automatic change speed gearbox.

14. A gearshift fork activation device for optionally activating at least two gearshift forks of a gearbox, comprising:
    a blocking device for blocking a gearshift fork which is not to be activated;
    a driver for driving a gearshift fork, which is to be activated, in an axial direction;
    a bearing axle arranged in the axial direction and slidable along its longitudinal axis, the bearing axle supporting at least one blocking part of the blocking device and at least one driver part of the driver, the at least one driver part and the at least one blocking part being arranged to together perform a rotational movement about the bearing axle; and
    wherein the at least one driver part has an external circumferential section with a first control contour provided for interacting with circumferential contours of at least two gearshift fork rods that support the at least two gearshift forks, respectively.

15. The gearshift fork activation device according to claim 14, wherein the bearing axle is a piston rod of a servo cylinder.

16. The gearshift fork activation device according to claim 14, wherein the driver part is operatively configured to be displaceable in the axial direction.

17. The gearshift fork activation device according to claim 14, wherein the bearing axle supports the driver part such that it is rotationally movable about the axial direction.

18. The gearshift fork activation device according to claim 14, wherein the first control contour drives the gearshift fork to be activated in the axial direction and, at the same time, does not act on the gearshift fork which is not to be activated.

19. The gearshift fork activation device according to claim 14, wherein the blocking part has an external circumferential section with a second control contour provided for interacting with the circumferential contours of the at least two gearshift fork rods supporting the at least two gearshift forks, respectively.

20. The gearshift fork activation device according to claim 19, wherein the second control contour blocks a movement of the gearshift fork, which is not to be activated, in the axial direction and, at the same time, releases a movement of the gearshift fork, which is to be activated, in the axial direction.

21. The gearshift fork activation device according to claim 20, wherein a rotational movement of the blocking part about the axial direction is coupled to a rotational movement of the driver part about the axial direction.

22. The gearshift fork activation device according to claim 21, wherein the driver part and the blocking part are arranged coaxially.

23. A gearshift fork activation device for optionally activating at least two gearshift forks of a gearbox, comprising:
    a blocking device for blocking a gearshift fork which is not to be activated;
    a driver for driving a gearshift fork, which is to be activated, in an axial direction;
    a bearing axle arranged in the axial direction and slidable along its longitudinal axis, the bearing axle supporting at least one blocking part of the blocking device and at least one driver part of the driver, the at least one driver part and the at least one blocking part being arranged to together perform a rotational movement about the bearing; and
    wherein the at least one blocking part has an external circumferential section with a second control contour provided for interacting with circumferential contours of at least two gearshift fork rods supporting the at least two gearshift forks, respectively.

24. The gearshift fork activation device according to claim 23, wherein the bearing axle is a piston rod of a servo cylinder.

25. The gearshift fork activation device according to claim 23, wherein the driver part is operatively configured to be displaceable in the axial direction.

26. The gearshift fork activation device according to claim 23, wherein the bearing axle supports the driver part such that it is rotationally movable about the axial direction.

27. The gearshift fork activation device according to claim 23, wherein the at least one driver part has an external circumferential section with a first control contour provided for interacting with circumferential contours of at least two gearshift fork rods supporting the at least two gearshift forks, respectively.

28. The gearshift fork activation device according to claim 27, wherein the first control contour drives the gearshift fork to be activated in the axial direction and, at the same time, does not act on the gearshift fork which is not to be activated.

29. The gearshift fork activation device according to claim 27, wherein the second control contour blocks a movement of the gearshift fork, which is not to be activated, in the axial direction and, at the same time, releases a movement of the gearshift fork, which is to be activated, in the axial direction.

30. The gearshift fork activation device according to claim 29, wherein a rotational movement of the blocking part about the axial direction is coupled to a rotational movement of the driver part about the axial direction.

31. The gearshift fork activation device according to claim 30, wherein the driver part and the blocking part are arranged coaxially.

* * * * *